Aug. 27, 1940.   W. L. G. POLLARD, JR   2,213,108
SPRAY PAINTING MACHINE
Filed Oct. 29, 1934   8 Sheets—Sheet 1

Inventor
Willard Pollard

Inventor
Willard Pollard

Inventor
Willard Pollard

Aug. 27, 1940.   W. L. G. POLLARD, JR   2,213,108
SPRAY PAINTING MACHINE
Filed Oct. 29, 1934   8 Sheets-Sheet 4

Inventor
Willard Pollard

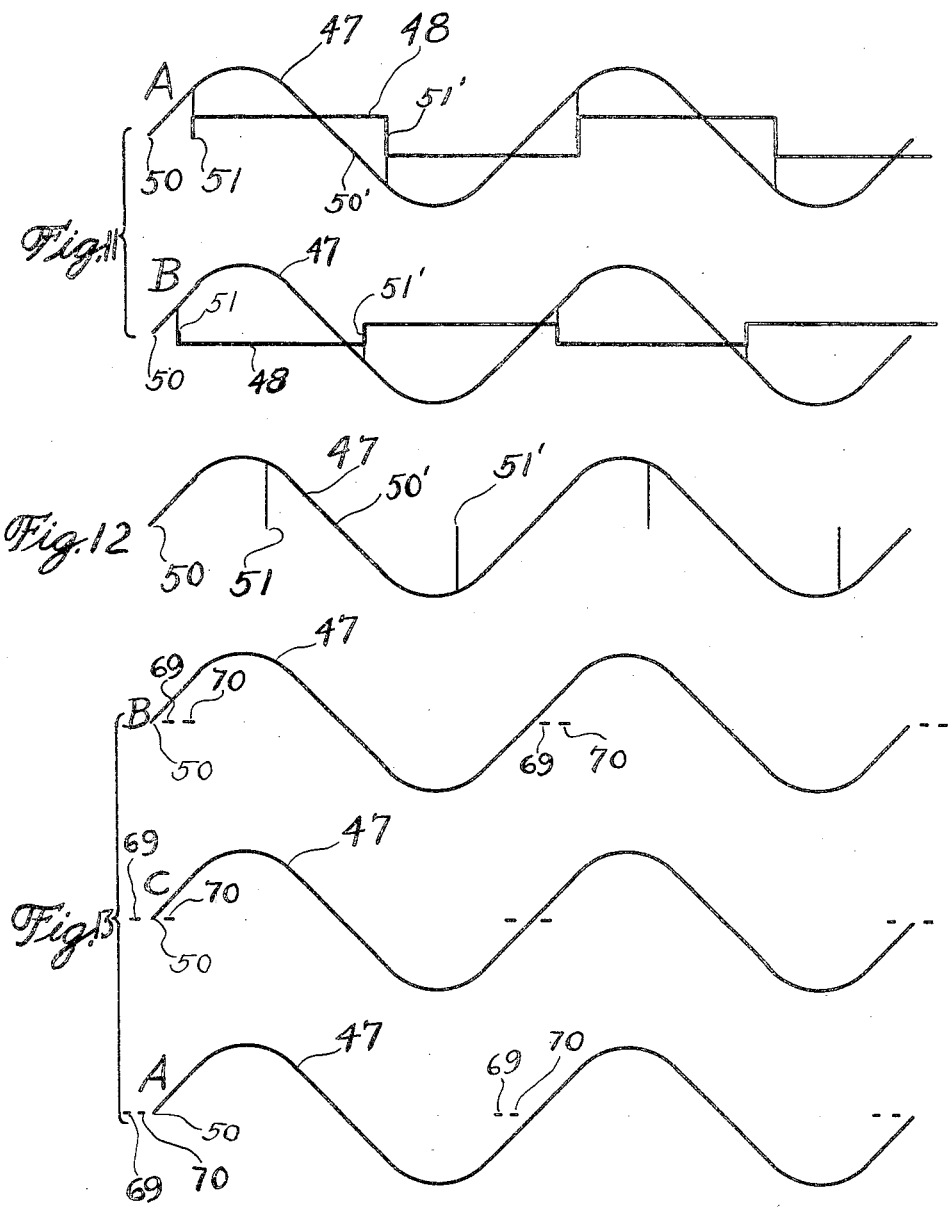

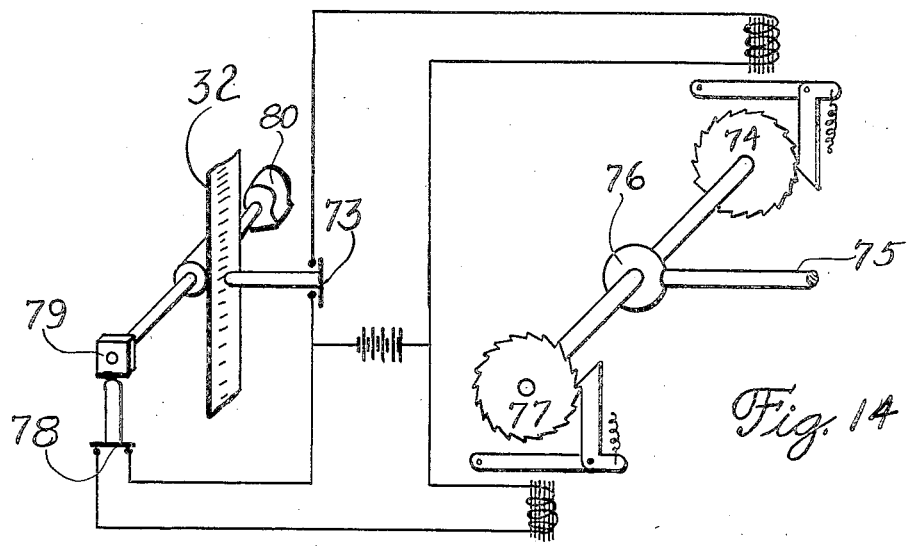
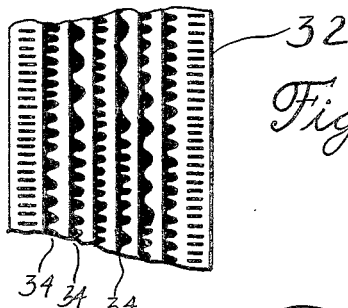
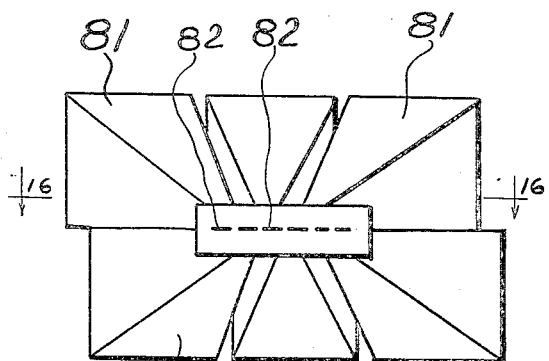
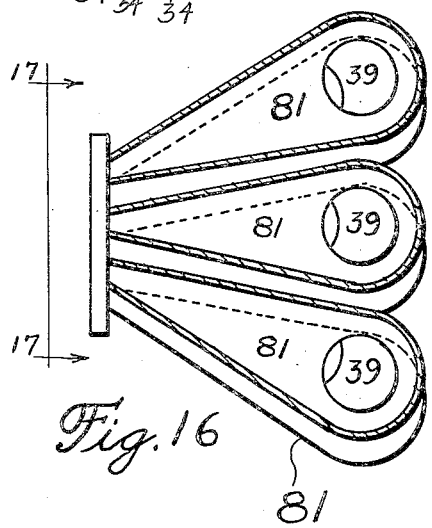

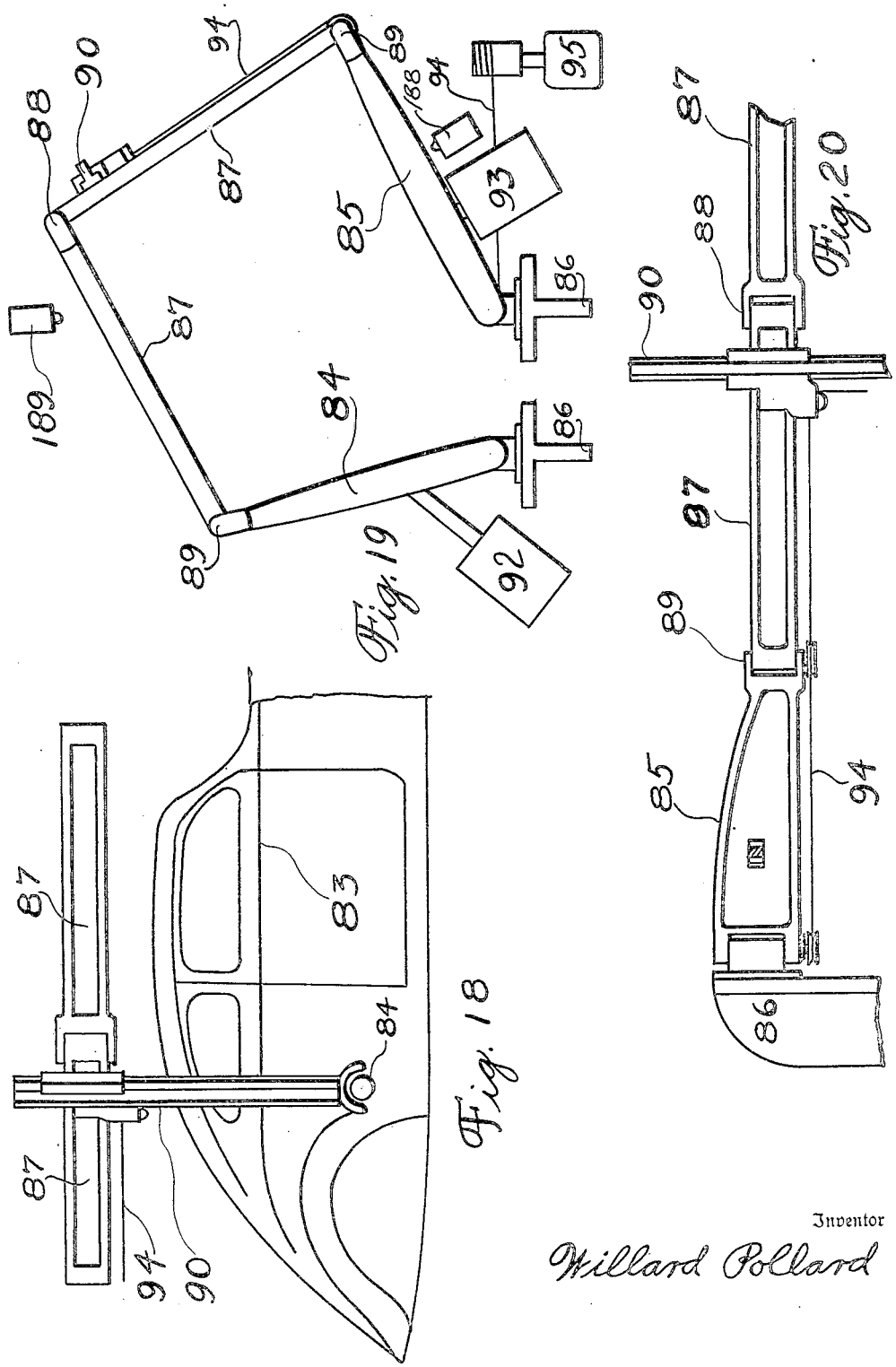

Patented Aug. 27, 1940

2,213,108

UNITED STATES PATENT OFFICE 2,213,108

SPRAY PAINTING MACHINE

Willard Lacey George Pollard, Jr., Evanston, Ill.

Application October 29, 1934, Serial No. 750,605

4 Claims. (Cl. 91—45)

My invention relates to spray painting machinery of the type adapted to automatically spray-paint a number of similar objects in manufacturing processes.

Hitherto such machinery has been limited to operation either upon small objects, or upon large objects having surfaces lying in one plane only. Further, such machinery hitherto has not admitted of ready alteration of program to operate upon objects of different shapes.

It is accordingly an object of my invention to provide a device which is able to operate upon objects of any reasonable size, and of any shape.

A further object is to secure the preceding object by imparting to the spray gun, in addition to the planar movement of the conventional devices, a further transverse component of motion so that the spray gun may depart from motion in a single plane to operate upon curved surfaces of such large size as to require such motion to keep the gun within range of the surface.

A further object is to provide means for rocking the gun to direct it toward the surface to be painted as its translatory motion requires such orientation.

A further object is to provide a painting machine of the above character, wherein the various components of motion described above are separately derived from separate but coordinate motion program control devices, the motions of which are combined by suitable linkages to produce the desired motion of the spray gun.

A further object is the adaptation of a spray-painting machine for operation by special electrical control devices separately described and claimed in my copending application Serial No. 267,125, filed April 10, 1939.

The above and other objects of my invention will appear more fully hereinafter from the following specification and the appended claims.

In the drawings:

Fig. 11 is an oscillogram of circuit conditions in the amplifier of Fig. 3.

Fig. 12 is an oscillogram of circuit conditions in Fig. 5.

Fig. 13 is an oscillogram of circuit conditions in Fig. 7.

Fig. 14 shows yet another alternative form of my invention.

Fig. 15 is a view of a motion-record film suitable for the simultaneous and coordinated control of a plurality of machines.

Fig. 16 is a horizontal section through a device for scanning the film record shown in Fig. 17.

Fig. 17 is a view taken on the line 17—17 of Fig. 16.

Fig. 18 is a view of a machine operated according to my invention for automatically spray-painting the body of an automobile.

Fig. 19 is a plan view of the machine shown in Fig. 18.

Fig. 20 is a detail view of a portion of the pantographic linkage used in the apparatus shown in Figs. 18 and 19, the links thereof being straightened out.

Figure 1:
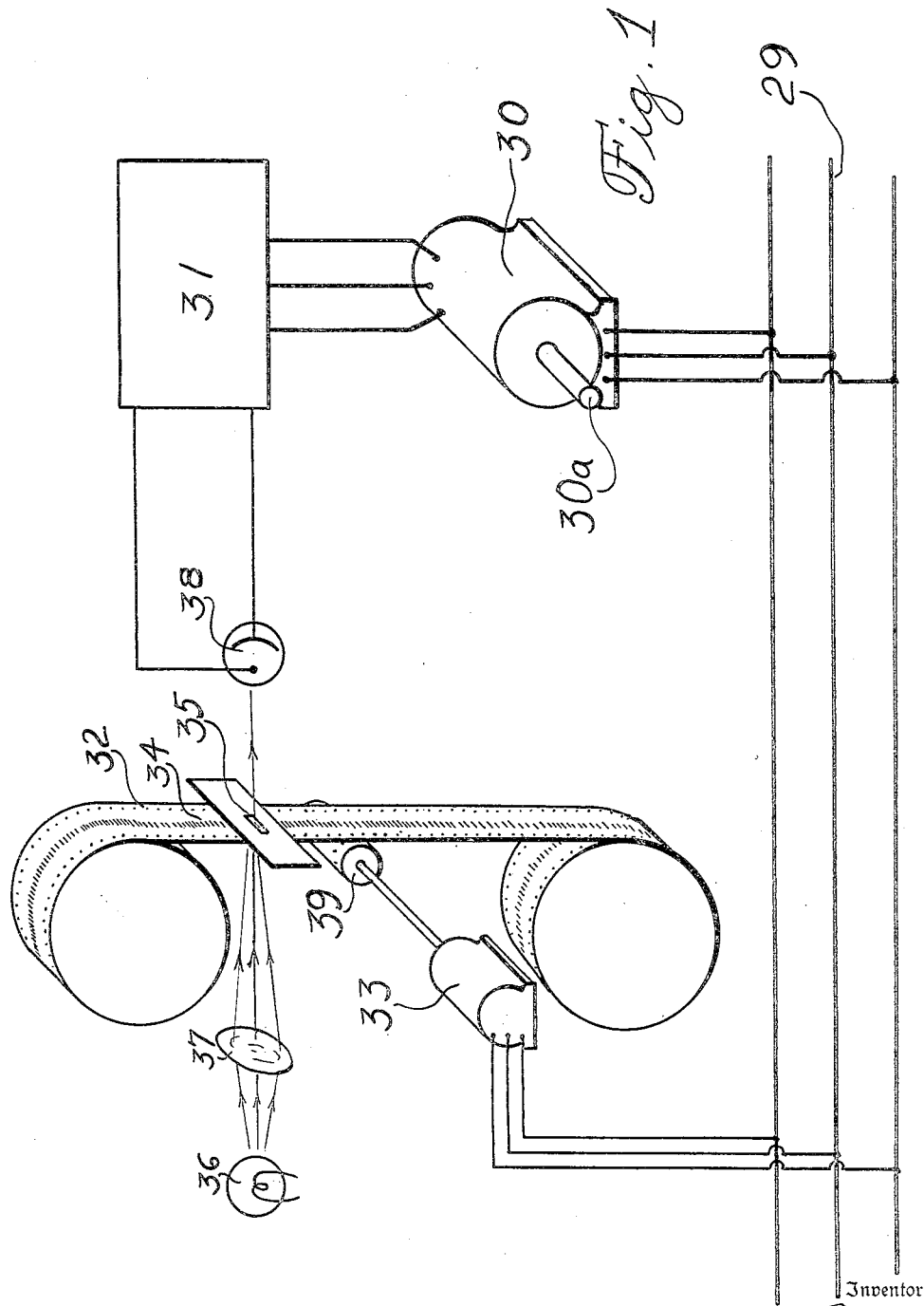
Fig. 1 is a schematic diagram of electrical control means adapted for use with my invention.

For the proper understanding of the present invention the electrical control devices will first be described but no claim is made in this case to the electrical devices per se, these being claimed in my copending case Serial No. 267,125, filed April 10, 1939. Referring to Fig. 1, I have shown therein a differential electric motor 30, the rotor shaft 30a of which is connected to a machine element (not shown) to actuate the same. The stator winding of the motor 30 is energized from a sixty-cycle polyphase supply main 29; the rotor winding is energized by a series of predetermined waves from a photophone amplifier 31, and as will appear more fully herein after, these waves cause the motor to perform a predetermined series of motions.

More particularly, the photophone comprises a source of light 36, projecting light through a condensing lens 37 and a record film 32 upon a photocell 38. The record film is driven by the synchronous motor 33 by means of the sprocket 39. The tripper portions 34 on the film 32, in passing in front of the slit 35, are serially juxtaposed thereto and interrupt the light falling upon the photocell 38, giving rise to electrical impulses in the amplifier 31, which impulses are amplified and produce cycles of current in the rotor of the differential electric motor 30.

It is desired to stress at this point the fact that the motor 33 which drives the film 32 is synchronous, and will always drive the film at a certain speed, assumed, for concreteness, to be one foot per second. Suppose now that the first foot of film contains 40 tripper portions 34, the second 60, the third 50 and the fourth 70. In this case it follows that each time the film is run, the photophone will invariably have reproduced 40 cycles at the end of the first second, 100 at the end of the second, 150 at the end of the third, and 220 at the end of the fourth.

Now it is a characteristic of a differential electric motor that the rotor thereof will have a net angular displacement, starting from a given moment, exactly equal in revolutions to the algebraic difference between the number of cycles that have passed through the stator winding and the number of cycles that have passed through the rotor winding. In the case of the apparatus shown in Figure 1, this difference, and the consequent displacement of the rotor shaft 30a, will be seen to be automatically and absolutely predetermined in time. For the number of cycles that will have passed through the stator at any time will be equal to the product of the time and the frequency of the supply source 29; and the number of cycles that have passed through the rotor is arbitrarily predetermined in time, as explained in the preceding paragraph. A tabulation based on the assumptions made as to the distribution of the tripper portions 34 on the film 32 will make this clear:

|  | Time | | | |
| --- | --- | --- | --- | --- |
|  | 1 sec. | 2 sec. | 3 sec. | 4 sec. |
| Total cycles in rotor | 40 | 100 | 150 | 220 |
| Total cycles in stator | 60 | 120 | 180 | 240 |
| Difference, and rotor displacement | 20 | 20 | 30 | 20 |

Thus the rotor shaft 30a and any mechanism associated therewith will automatically have gone through a series of predetermined motions, the rotor moving 20 revolutions forward during the first second, standing still during the second second, moving 10 revolutions further forward during the third, and reversing 10 revolutions during the fourth. The mechanism will have been actuated by the differential electric motor much as a cam would have actuated it. It will be seen, however, that this arrangement is much superior to any camming arrangement, in that an indefinitely long and complicated movement can be reproduced accurately without the use of unduly bulky or complicated apparatus.

*The amplifier 31*

In the foregoing discussion the amplifier 31 of Fig. 1 has been taken for granted. A conventional amplifier could, it is true, be used in place of the amplifier 31. However, the prior art does not show any amplifier having sufficient capacity or desirable characteristics for this particular use, especially since it is necessary to provide means whereby the motor 30 will operate in both directions. A brief description will therefore be made of several amplifying arrangements suitable for use with my invention.

Figure 2:
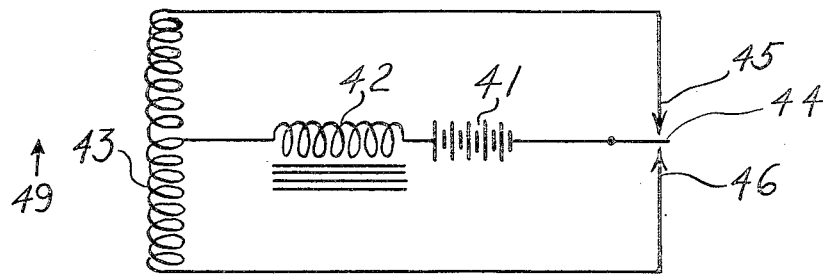
Fig. 2 is a wiring diagram of an electromechanical inverter-converter analogous to, and used in explanation of the amplifying means shown in Fig. 1.
Figure 3:
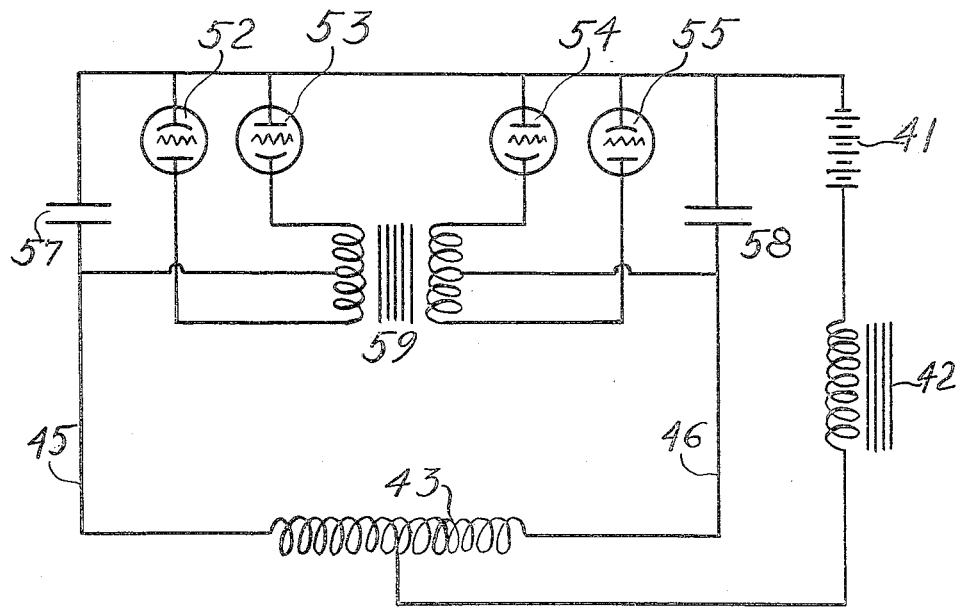
Fig. 3 is a wiring diagram of the amplifying means shown in Fig. 1.

Fig. 3 shows on such amplifier, an inverter-converter using Thyratron tubes. The action of this amplifier will be described by analogy to the contactor-alternator shown in Fig. 2, in which a battery 41 acts through a heavy inductance 42 upon the midpoint of the rotor coil 43 of the differential electric motor. A vibrating contactor 44 (which we will assume is made to oscillate in accordance with the impulses from the photo-phone) alternately connects the opposite ends 45 and 46 of the rotor coil to the negative terminal of the battery 41, inducing alternating magnetomotive forces in the rotor.

Referring to the oscillogram of Fig. 11, the oscillograms A and B represent respectively circuit conditions in Fig. 2 when the torque upon the rotor is in the same direction, and opposed to, the direction of rotation of the field of the stator. The curve 47 in each case represents the generated counter E. M. F. in the coil 43; the curve 48 represents the current in the free end 45 or 46 (according to which is carrying current at that time) of the coil 43. All of these values are considered as positive in the direction of the arrow 49 of Fig. 2.

The E. M. F. of the battery is of such a value that when the zero points 50, 50' etc., of the counter E. M. F. oscillogram 47 lag approximately 45 degrees behind the points 51, 51' of the current oscillogram 48 at which the change of the contact 44 occurs, as indicated in curve A the average of the counter E. M. F. from the point 51 to the point 51' will be less than the E. M. F. of the battery 41, which will accordingly do work upon the rotor coil and cause it to run in opposition to the rotating field, so as to advance the phase of the counter E. M. F. until the average thereof increases sufficiently to balance the battery. If however, the phase of the counter E. M. F. advances too far, the average counter E. M. F. will increase to a value which will overcome the E. M. F. of the battery as indicated in the curve B. In this case, the rotor will do work upon the battery 41, and consequently will tend to run after the rotating field, retarding the phase until balance is again established. The net result, it will be seen, is to cause the rotor of the differential electric motor to move so as to keep the frequency of the currents induced in it equal to the frequency of the wave from the photophone.

Figure 4:
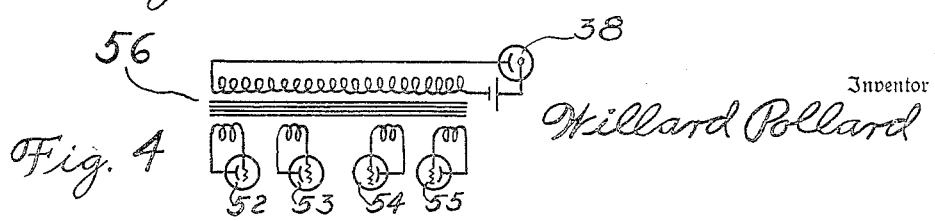
Fig. 4 is a wiring diagram of the grid circuit of Fig. 3.

The principle of the inverter-converter being thus explained, it remains to show the means for carrying it out by means of Thyratron tubes. Referring to Fig. 3, it will be seen that the circuit shown therein is entirely similar to the circuit of Fig. 2, the Thyratrons 52 and 53 replacing the contact 45, and the Thyratrons 54 and 55 replacing the contact 46. It will be noted that each pair of tubes has both a rectifier and an inverter tube, so as to provide bi-directional conductivity when the tubes are energized, exactly as a closed contact would conduct. By means of the grid excitation wiring of Fig. 4 the Thyratrons 52 and 53 are held open for 180 degree periods of the impulses from the photocell 38, alternating with 180 degree periods during which the Thyratrons 54 and 55 are held open. As shown, this grid excitation wiring includes the photocell 38, which produces pulsating currents in the primary of the transformer 56, the secondary coils of which are arranged so as to produce the above-described excitation.

At the end of each of the 180 degree periods it is necessary to snuff out the current in the Thyratrons that conducted current during that period. This may be accomplished in a number of ways, the simplest being shown comprising a pair of condensers 57 and 58. The condenser 57 acquires a charge during the periods in which the Thyratrons 52 and 53 are non-conducting. When these tubes are fired, the condenser discharges through the transformer 59, inducing a voltage in the tubes 54 and 55 which snuffs out any current they may be carrying. In a similar manner, the condenser 58 serves to snuff out the current in the tubes 52 and 53.

Figure 5:
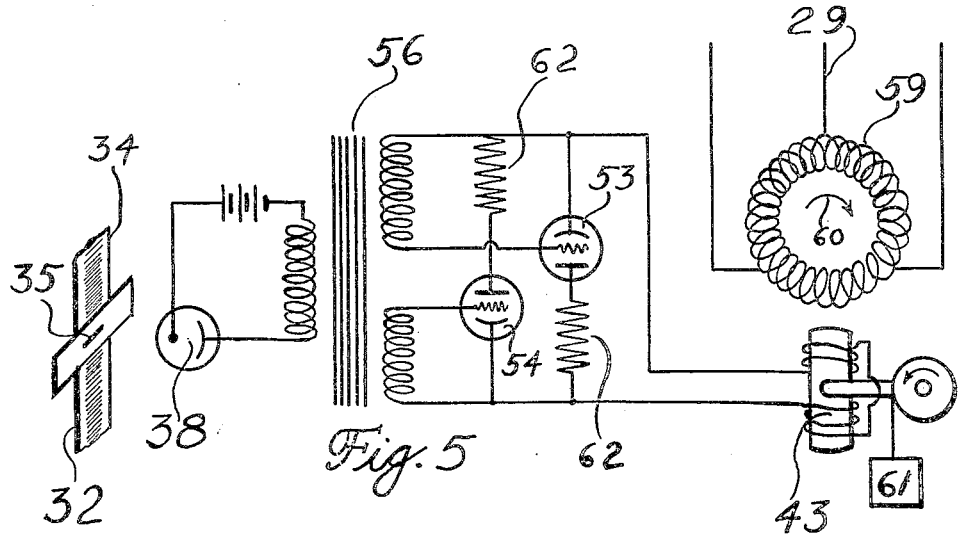
Fig. 5 is a wiring diagram of a somewhat simpler amplifying device for use in my invention.

Fig. 5 shows another method of operating a differential electric motor from a photophone. The differential electric motor comprises a stator 59 energized from the power line 29, and produces a field rotating in the direction of the arrow 60. The rotor 43 is mechanically biased by the weight 61 in a direction opposite to the rotation of the field of the stator, and the E. M. F. induced in the rotor by this rotating field is discharged through the rectifier Thyratrons 53 and 54 and the resistances 62, producing currents which cause a torque in the rotor opposing the torque of the weight 61. These Thyratrons are fired at alternate 180 degree intervals by the photocell 38 of the photo-phone, and control the currents in the rotor 43 in such a manner that the frequency of the currents induced therein must equal the frequency of the interruption of light falling on the photocell 38.

Fig. 12 shows the circuit conditions of the apparatus of Fig. 5, curve 47 being the E. M. F. in the rotor 43, and the points 51 the firing instants of the Thyratrons. As is well known, only that part of the curve 47 which lies between the points 51 and 50' will represent E. M. F. effective to produce current in the resistances 62, and any shift in relative phase of the firing points and the E. M. F. curve vary this effective E. M. F. If, for instance the rotor 43 is revolving at a constant speed and the excitation frequency of the tubes is constant momentarily, and then the weight 61 overcomes the drag of the rotating field, accelerating the rotor in a counterclockwise direction, the phase, and consequently the effective value, of the E. M. F. will be advanced this increase in effective value of the effective E. M. F. produces an increased current in the rotor 43 and resistances 62, and consequently an increased torque in a clockwise direction, until the counterclockwise torque of the weight 61 is balanced. Conversely, if the torque of the rotating field should overbalance the torque of the weight, the rotor 43 will be accelerated in a clockwise direction, the effective value of the E. M. F. decreased and the currents in the rotor lessened, until the weight 61 again balances the field torque. The net result is to cause the motor to perform the evolutions of movement demanded by the distribution of the tripper portions 34 on the control film 32.

It will be noted that the resistances 62 are distributed in the branch circuits of the Thyratrons 53 and 54. This is done in order to secure more desirable inductance characteristics. If desired, the resistances may be concentrated directly in series with the rotor and the full-wave rectifier.

Figure 9:
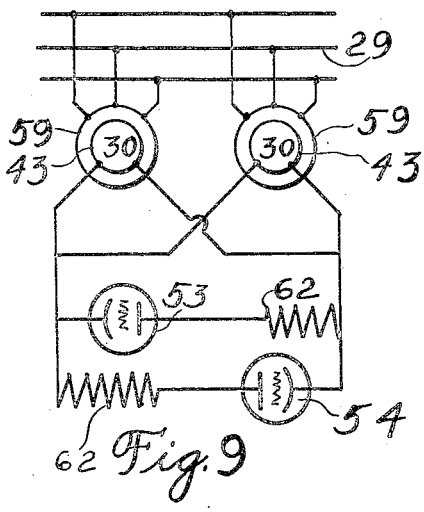
Fig. 9 is a wiring diagram showing a plurality of motors operated in synchronism by means of my invention.

In a large manufacturing plant, a number of similar machines may be operating simultaneously. In order to economize on photophone equipment, a number of machine-actuating differential electrical motors may be actuated in parallel from a common amplifier, as indicated in Fig. 9. The rotors 43 of the selsyns 30 are biased as in Fig. 5, and are connected in parallel to discharge through a common wasting rectifier. Any asynchronism between the two rotors will cause correcting currents to flow between them.

Figure 6:
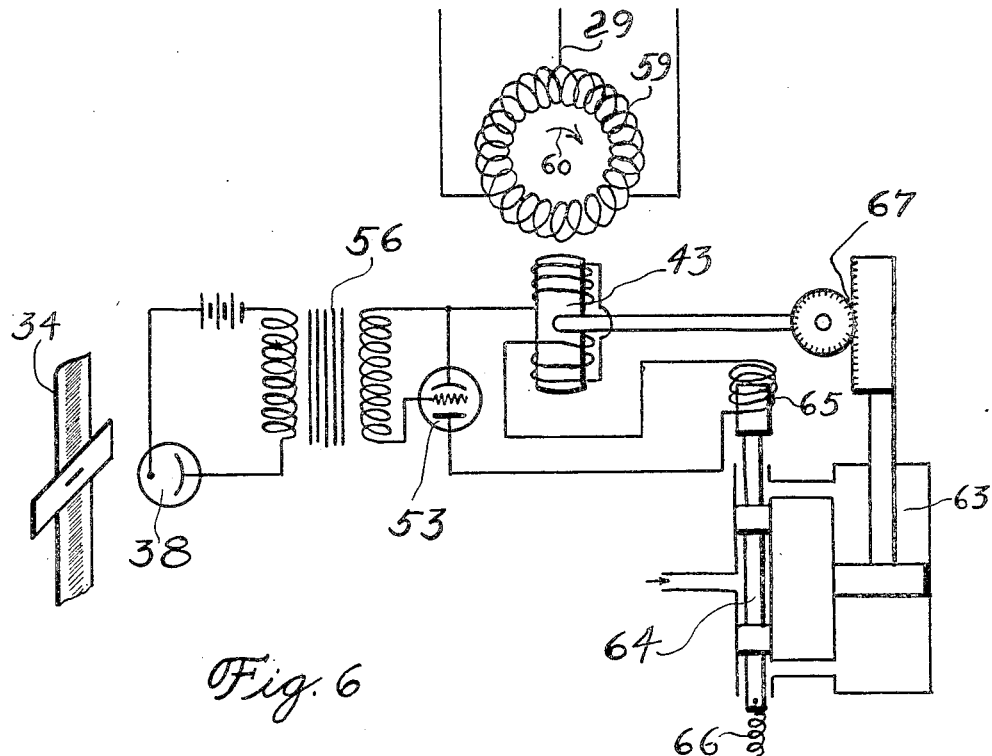
Fig. 6 is a schematic diagram of a pneumatic servo motor operated in accordance with my invention.

Fig. 6 shows a pneumatic follow-up motor 63 operating analogously to the apparatus shown in Fig. 5. In this case, the increase and decrease in torque of the rotor 43 due to displacement from its proper position is supplemented by the action of the fluid pressure motor 63, the slide valve 64 of which is actuated by means of current derived from the motor through the rectifier 53. It will suffice to say that, if the current in the solenoid 65 exceeds a certain amount, the valve 64 is pulled up against the action of the spring 66, and causes the fluid pressure motor 63 to rotate the differential electric motor to decrease the current. Conversely, if the current decreases below a certain amount, the spring 66 will overcome the solenoid 65 and the rotor will be rotated counterclockwise to increase the current. At intermediate values of current the valve 64 will occupy intermediate positions.

Figure 7:
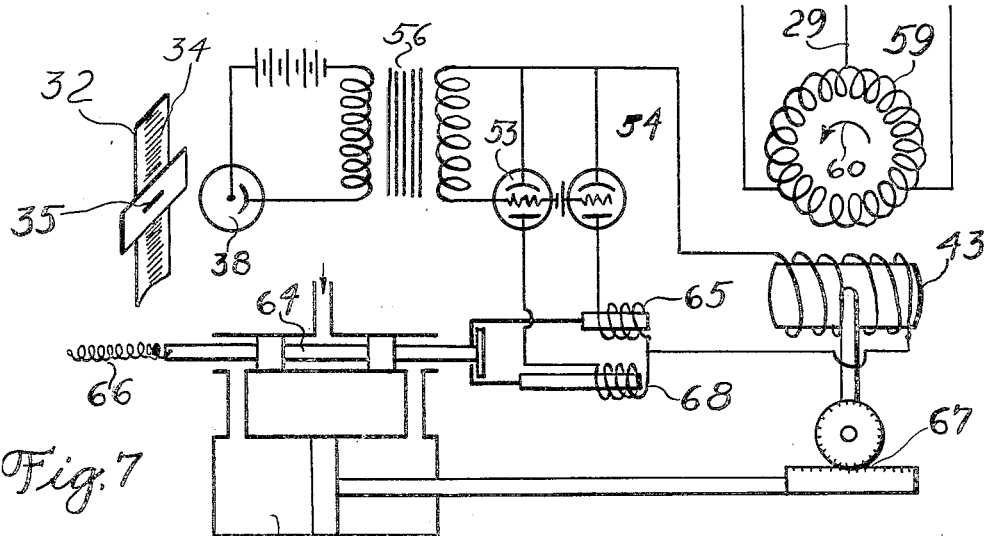
Fig. 7 is a schematic diagram of another method of operating a pneumatic servo motor according to my invention.

Fig. 7 shows a fluid pressure actuated differential electric motor system operating on a somewhat different principle than that explained in connection with Figs. 5 and 6. The slide valve 64 is biased, as before, by means of a spring 66. Two separate solenoids are used to actuate this valve, the solenoid 65 which when energized pulls the valve only as far as its neutral position, and the solenoid 68 which pulls the valve to its extreme right hand position. When neither solenoid is energized, the fluid pressure motor 63 rotates the rotor counterclockwise; when the solenoid 65 is energized, the fluid pressure motor is exhausted of pressure; and when both solenoids 65 and 68 are energized, the fluid pressure motor rotates clockwise.

The proper energisation of the solenoids in accordance with the agreement or disagreement of the position of the rotor 43 with the position required by the film 32 is accomplished by the phase relation of the excitation of the two Thyratrons 53 and 54 with respect to the E. M. F. in the rotor which here acts as a device to shift the phase of the currents coming from the main power line to the grids of the Thyratrons according to the motion of the rotor 43. The grid of the Thyratron 53 is biased, so that the period of excitation of the tube 53 dies out more quickly than that of the tube 54. Referring to the oscillograms in Fig. 13, the dots 69 and 70 indicate the end points of the open periods of the Thyratrons 53 and 54 respectively, showing the results of this biasing. In operation, it will be seen that if, as in the curve B the two points 69 and 70 both expire before the E. M. F. of the rotor coil 43 becomes positive, no current will flow in either of the solenoids 65 or 68 and the rotor 43 will be rotated counterclockwise with the field, which also rotates counterclockwise as shown by the arrow 60 (Fig. 7) retarding the phase of the E. M. F. transmitted from the rotor to the grids of the Thyratrons. When the E. M. F. has been so far retarded that the endpoint 70 overtakes a positive loop of the E. M. F. curve 47, the Thyratron 54 will be fired, and apply the entire succeeding half-cycle to the solenoid 65, neutralizing the valve 64 and arresting the retardation of the E. M. F. curve, as shown in curve C. If the E. M. F. curve is retarded so far that both endpoints 69 and 70 overtake it (curve A), both solenoids will be energized, and the fluid pressure motor 63 will rotate the rotor 43 to advance the phase.

*The original recording of the motion*

Figure 8:
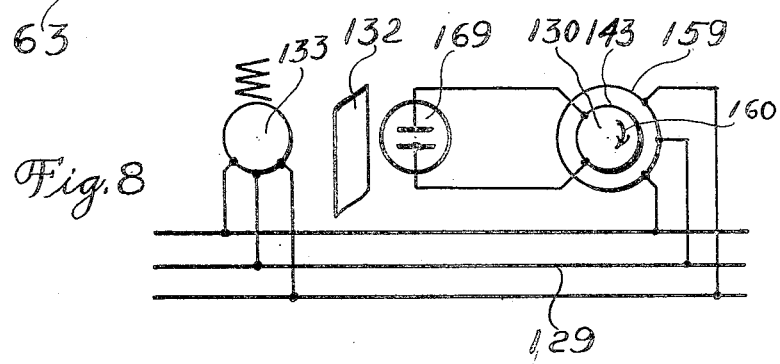
Fig. 8 is a wiring diagram of a device for recording the motion which is to be reproduced.

The record film 32 used in the devices may be originally produced in a number of ways. Preferably, such an original recording should be made by manually or otherwise causing the machine it is intended to automatically control to perform the desired operation, and automatically producing a film record of that motion. One simple means for accomplishing the above result is shown in Fig. 8 as including a phase shifting device 130, having a stator 159 connected to a polyphase main 129 and its rotor 143 connected to the glow tube or light valve 169, and a photophone recorder through which a sensitive film 132 is driven by a synchronous motor 133 also operated from the main 129. The rotor 143 is mechanically connected to the element (not shown) whose motion it is desired to record.

The photoglow tube 169 is energized by pulsations induced in the rotor 143 by the field of the stator 159, which field rotates in the direction of the arrow 160. Obviously, rotating the rotor 143 in either direction will shift the phase of the E. M. F. induced therein and will correspondingly alter the distribution of the pulsations recorded on the film 32; and the resulting distribution will be such that the film, when developed and then used in any of the devices hereinbefore described, will cause these devices to exactly reproduce the motion originally recorded by the phase shifting device 130. This will appear from a concrete example. Suppose that the main 128 has a frequency of 60 cycles per second; that the synchronous motor 133 drives the film 132 at the rate of 1 foot per second; and that during the first one hundred seconds the rotor 43 has undergone a net angular displacement, in the direction of the arrow 160, of 500 revolutions. The total cycles of current that will have passed through the stator 169 will be 6000. The cycles recorded will, however, equal the difference between the cycles in the stator and the angular displacement of the rotor or 5500 cycles. If now this film is developed, and run through one of the reproducing devices, the cycles that will have passed through the stator 159 will again be 6000 at the end of a minute and those in the rotor will have been made to equal 5500 (since the film will have 5500 tripper portions on it) and the resulting displacement of the rotor will be 500 revolutions—precisely the displacement of the recording phase shifting device 130 at the corresponding time during the recording operation. The above reasoning will obviously apply for any intermediate or subsequent moment in the operation, so that the reproducing motor will precisely and continuously reproduce the original movement of the recording motor.

In all the foregoing discussion of the alternating current circuits a constant frequency has been assumed for the power supply 29 and 129. Since, however, only linear relations are involved in the operation of the system, the action of the motors will be seen to be independent of the frequency either of recording or reproducing supply lines, a given position of the film 32 causing a given position of the reproducing motor.

*Non-electrical forms of the invention*

Figure 10:
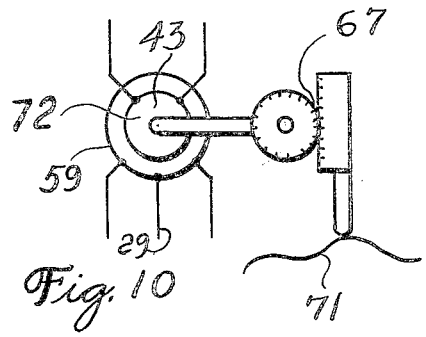
Fig. 10 shows an alternative form of my invention.
Figure 21:
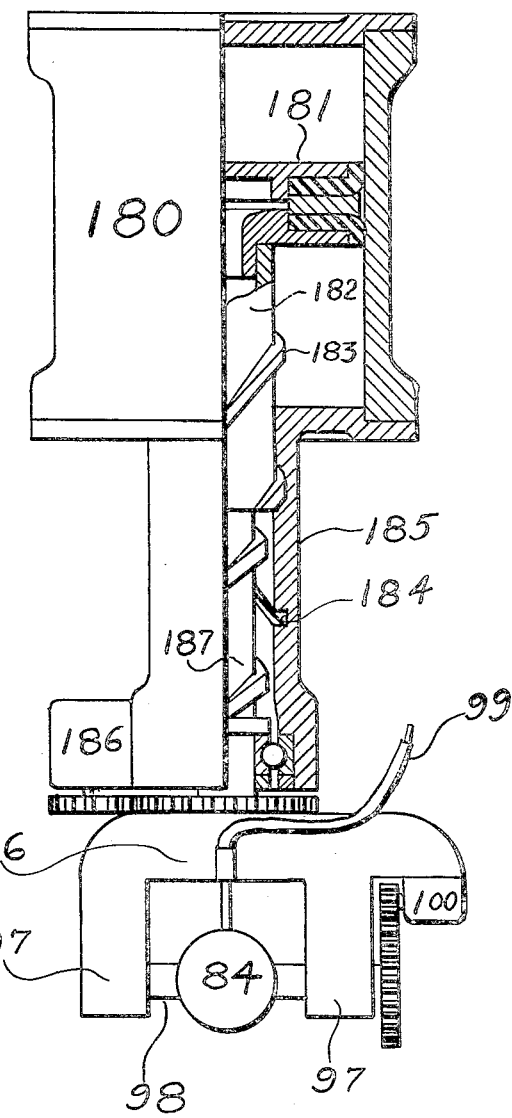
Fig. 21 shows a spray painting head suitable for use with the machine shown in Figs. 18 to 20.

The invention may also be carried out by means wholly or partially mechanical. For instance, Fig. 10 shows a cam 71 actuating a Selsyn transmitter 72 by means of a rack-and-pinion 67. The stator 59 of this transmitter is connected to a supply source 29, and the rotor 43 is electrically connected to a second (receiving) Selsyn, not shown, which receiving Selsyn is mechanically connected to, and actuates, the machine to be governed in accordance with the shape of the cam 71.

An electromechanical perforated-tape-controlled form of the invention is shown in Fig. 14 as including a moving perforated tape record 32 driven by means of a motor 80, the perforations in the tape acting analogously to the tripper portions 34 of Fig. 1 to open and close a contact 73 actuating an electromagnetic pawl-and-ratchet mechanism 74 at each stroke, which pawl and ratchet mechanism tends to operate the driven shaft 75 in one direction through a differential gear 76. Separate means, including a pawl-and-ratchet 77 actuated electrically from a switch periodically tripped by the cam 79 driven in parallel with the record 32 by the motor 80, also act on the shaft 75 through the differential gear, but tends to drive it in the opposite direction. Obviously, the displacement of the shaft 75 will be proportional to the difference in the number of impulses coming respectively to the mechanisms 74 and 77. This type has the advantage that the action may be temporarily arrested simply by stopping the motor 80, which advantage, in certain applications, will appear more fully hereinafter.

*Correlation of the operation of a number of machine elements to produce a unitary result spray-painting machine*

Obviously, a single automatic control motor and a mechanical element driven thereby and performing a program of movements entirely uncorrelated with any other element or workpiece would be no more than a scientific curiosity. To produce a unitary result, it becomes necessary to have a plurality of mechanical elements moving in concert. I accomplish this result by recording a plurality of motion-records as wave tracks side by side upon a single record strip, such as shown in Fig. 15, and scan these tracks 34 as they pass by means of the gang scanner shown in Figs. 16 and 17, as shown, this gang scanner includes a plurality of chambers 81, each containing a photocell 39, and each having a scanning slit 82 for scanning one of the wave tracks 34 on the film shown in Fig. 15. Each of the photocells controls a single differential electric motor, which operates a machine element. The whole plurality of machine elements cooperates to produce a single desired operation.

As an example, one such plurality of cooperatively controlled motors is shown in Figs. 18 to 21. This device is a machine for automatically spray-painting an automobile body 83. In general, a pantographic linkage automatically moves and orientates a spray gun 84 around the automobile body 83 so as to paint the body precisely in the manner in which a human operator would perform the task. In fact, the motion might well be the exact duplicate of the motion which a human operator once actually performed in the painting of an automobile, since the easiest way of obtaining a record of the desired motion would be to have a human operator go through the motions.

More particularly, the spray gun carrying pantograph comprises a pair of primary arms 84 and 85 pivoted upon vertical axes on the fixed supports 86, and a pair of secondary arms 87 pivoted together at the point 88 and to the primary arms at the points 89. A vertically reciprocable slide 90 is supported near the junction of the two arms 87, and carries the spray gun at its lower end. The motions of three elements —the primary arms 84 and 85 and the slide 90— determine the motion of the spray gun. The primary arms 84 and 85 are put through the desired motions by means of a pair of pneumatic differential electric automatic control motors 92 and 93, which pneumatic motors are of either of the types shown in Figs. 6 or 7. The slide 90 is reciprocated by means of a cable 94 extending from a motor 95, which may be operated by either of the systems of Figs. 3 or 5. All of these differential electric motors are operated from a single film such as that shown in Fig. 15. This film was recorded by connecting each of the differential motors 92, 93 and 95 as shown in Fig. 8 to act as phase-shifting motion recording devices, each glow tube recording a single track upon the sensitive film. A human operator then paints one auto body, using the spray gun 84. When the film is developed, and run through again with the differential motors arranged to be controlling motors instead of recording motors, the spray gun will be moved in precisely the path through which the human operator originally moved it, and a second auto body substituted for the first body will receive a coat of paint.

It is of course obvious that the spray gun 84 must be aimed at the auto body, as well as moved around it. This aiming is also accomplished by means of automatically controlled differential electric motors, the mechanism therefor being shown more particularly in Fig. 21. As shown, the aiming device comprises the vertically journalled gimbal fork 96 between the arms 97 of which the spray gun 84 is journalled on the axle 98. Oscillation of the gun upon this axle is caused by means of a Bowden cable 99 extending to a pneumatic servo motor (not shown) the valves of which are controlled by the midget differential electric device 100 geared to the axle 98. The rotation of the fork 96 about its axis is accomplished by means of an automatic differential electric control servo motor 180 vertically in line therewith. This servo has a piston 181 longitudinally and rotationally oscillatable therein, which piston is secured to and actuates an internally and externally threaded sleeve 182. The external threads 183 are the steeper, and engage threads 184 formed in the housing 185. The internal threads of the sleeve 182 engage the threaded shank 187 of the fork 96. The difference in the pitch of the two sets of threads causes vertical reciprocation of the piston 181 to rotate the fork 96. A control differential electric device 186 is geared to the fork 96, and actuates the valves of the servo 180 by either of the systems of Fig. 6 or 7. Both differential electric motors 100 and 186 are run collaterally with the other differential electric motors in the machine from the same plural track record film. The fact that the piston 181 is secured to the sleeve 182 causes it to rotate therewith in opposite direction from the direction of rotation of the gun 84 so as to partially dynamically balance its mass.

A somewhat auxiliary, but nevertheless important, feature of the device shown in the Figs. 18 to 21 is a limit switch 188 placed so as to arrest the arms 84 when said arms swing into engagement therewith. This arrest may be accomplished by so connecting the switch that when engaged it will considerably reduce the air pressure flowing to the cylinder 93, so that the machinery will not be strained if the control system tries to actuate the arm beyond the switch 188. At the beginning of each cycle of operations the controlling film of the automaton is prearranged to bring the arms 85 up to (and even beyond, if the switch were absent) the switch 188, arresting the arm in this extreme position, giving the machine a fresh starting point for the ensuing cycle of operations, and erasing any previous error. I also provide a second auxiliary switch 189, which the automaton can reach over and trip by prearrangement; the switch may either cut off the spray gun, change the record, or perform any other minor operation.

Reference is made to my application Serial No. 267,125, filed April 10, 1934, and inadvertently allowed to lapse, and to my pending application Serial No. 345,769, filed July 16, 1940, which disclose, in more complete and elaborate form, and claim the electric control devices preferably used to operate the spray painting machine claimed in the present case.

Many variations of the above invention will suggest themselves to those skilled in the art, wherefore I desire to be limited only by the scope of the appended claims.

I claim:

1. A mechanism for manipulating a paint gun to paint an irregularly curved surface comprising a first movable carrier member, means for moving said member along a path conforming to said irregular surface, a second carrier member having a journalled connection with said first carrier member, and a third carrier member having a journalled connection with said second carrier member, and having said paint gun secured thereto, the axes of said journalled connections being arranged at an angle to each other whereby to permit said paint gun to be oriented continuously in the direction of said surface as said first carrier member moves along said path.

2. A painting machine for painting an irregularly curved surface comprising a fixed support, a pair of primary arms each pivoted at one end to said fixed support and having the other end free to oscillate about said support, a pair of secondary arms, one pivoted to the free end of one of said primary arms and the other pivoted to the free end of the other of said primary arms, a pivotal connection between said secondary arms, a spray gun carrier mounted upon one of said secondary arms, a spray gun pivoted to said carrier, and means for raising and lowering said spray gun carrier with respect to said support.

3. A machine for painting an irregularly curved surface comprising a first movable carrier adapted to have movement in a plane adjacent said surface, a slide member carried on said carrier and having one end adjacent said surface, a sliding connection between said slide member and said carrier member to permit said end of the slide member to follow a path conforming to said surface as said carrier member moves in said plane, a paint gun carried on said end of the slide member and having a pivotal connection therewith, whereby said gun may be continuously directed toward said surface, and means for simultaneously moving said movable carrier in said plane past said surface, reciprocating said slide member relatively to said carrier to carry the gun in a path conforming to said surface, and for rocking said gun upon said pivotal connection to keep said gun continuously directed toward said surface.

4. A spray painting machine, comprising a paint gun, a support for said paint gun, a pivotal connection between said support and said paint gun upon which the paint gun is free to be rocked relatively to said support, and three mechanisms acting in simultaneous mutual relation and including a first mechanism for imparting translatory motion to said support in a first direction, a second mechanism for imparting translatory motion to said support in a direction transverse to said first named motion, and a third mechanism adapted to impart rocking motion to said paint gun upon its said pivotal connection.

WILLARD LACEY GEORGE POLLARD, Jr.